(12) United States Patent
Kochie et al.

(10) Patent No.: US 7,592,904 B2
(45) Date of Patent: *Sep. 22, 2009

(54) TIRE PRESSURE MONITOR SYSTEM MODULE

(75) Inventors: Robert Kochie, Mantorville, MN (US); Edward Lipscomb, Lakeville, MN (US)

(73) Assignee: SPX Corporation, Charlotte, NC (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/589,201

(22) Filed: Oct. 30, 2006

(65) Prior Publication Data

US 2008/0143506 A1    Jun. 19, 2008

(51) Int. Cl.
B60C 23/00    (2006.01)

(52) U.S. Cl. .................. 340/442; 340/426.33; 73/146.2; 116/34 R

(58) Field of Classification Search ................... 340/442
See application file for complete search history.

(56) References Cited

U.S. PATENT DOCUMENTS

| | | | |
|---|---|---|---|
| 5,124,410 A | 6/1992 | Campbell | |
| 5,462,374 A | 10/1995 | Kohno | |
| 5,562,782 A | 10/1996 | Takahashi | |
| 5,562,787 A | 10/1996 | Koch et al. | |
| 5,573,611 A * | 11/1996 | Koch et al. | 152/152.1 |
| 5,600,301 A | 2/1997 | Robinson, III | |
| 5,602,301 A | 2/1997 | Field | |
| 5,602,524 A | 2/1997 | Mock et al. | |
| 5,731,516 A | 3/1998 | Handfield et al. | |
| 5,952,935 A | 9/1999 | Mejia et al. | |
| 6,172,609 B1 | 1/2001 | Lu et al. | |
| 6,243,007 B1 | 6/2001 | McLaughlin et al. | |
| 6,340,929 B1 | 1/2002 | Katou et al. | |
| 6,414,592 B1 | 7/2002 | Dixit et al. | |

(Continued)

FOREIGN PATENT DOCUMENTS

EP    1026015 A2    8/2000

(Continued)

OTHER PUBLICATIONS

Bartec Auto ID Limited—Activation Tool BXR2000A1, Bartec Auto ID Activation Tool (Sep. 3, 2001).

(Continued)

*Primary Examiner*—George A Bugg
(74) *Attorney, Agent, or Firm*—Baker & Hostetler LLP

(57) ABSTRACT

A tire pressure monitor system module provides modular products with tire pressure monitor system functionality. The tire pressure monitor system module may be added to a modular product to provide tire pressure monitor system functionality. The tire pressure monitor system module may be a stand-alone module that may be attached, connected or in communication with a modular product. The tire pressure monitor system tool may include all of the functionality available to tire pressure monitor systems. The tire pressure monitor system module may include modules for transmitting and receiving signals from a tire pressure monitor system, resetting and diagnosing a tire pressure monitor system, initiating, determining, and selecting procedures associated with the tire pressure monitor system, simulating a tire pressure sensor of a tire pressure monitor system, storing, displaying, and updating information related to tire pressure monitor systems, and notifying a user of a status of a procedure and that a procedure has been completed.

61 Claims, 8 Drawing Sheets

U.S. PATENT DOCUMENTS

| | | |
|---|---|---|
| 6,438,467 B1 | 8/2002 | Pacsai |
| 6,441,727 B1 | 8/2002 | LeMense |
| 6,617,962 B1 | 9/2003 | Horwitz et al. |
| 6,630,885 B2 * | 10/2003 | Hardman et al. ............ 340/505 |
| 6,662,642 B2 | 12/2003 | Breed et al. |
| 6,864,785 B2 | 3/2005 | Marguet et al. |
| 6,904,796 B2 | 6/2005 | Pacsai et al. |
| 6,945,087 B2 | 9/2005 | Porter et al. |
| 6,989,741 B2 | 1/2006 | Kenny et al. |
| 7,053,761 B2 * | 5/2006 | Schofield et al. ............ 340/447 |
| 7,075,421 B1 * | 7/2006 | Tuttle ......................... 340/449 |
| 7,161,476 B2 * | 1/2007 | Hardman et al. ............ 340/442 |
| 7,319,848 B2 * | 1/2008 | Obradovich et al. .......... 455/99 |
| 2002/0130771 A1 | 9/2002 | Osborne et al. |
| 2003/0080862 A1 | 5/2003 | Kranz |
| 2003/0121320 A1 | 7/2003 | Okubo |
| 2004/0036595 A1 | 2/2004 | Kenny et al. |

FOREIGN PATENT DOCUMENTS

| | | |
|---|---|---|
| EP | 1092568 A2 | 4/2001 |
| GB | 2305074 A | 3/1997 |
| GB | 2308947 A | 7/1997 |

OTHER PUBLICATIONS

Bartec Auto ID Limited—BXR LHF—2000 User Manual, Bartec Auto ID—BXR LHF 2000—Range of Rugged Hand Held TPMS Readers (Aug. 2002).

"Multi Standard Reader Product Range—Overview of Product Range", id Systems Ltd. (undated document).

"Market demands RF/ID standardization", id Systems Ltd. (undated document).

* cited by examiner

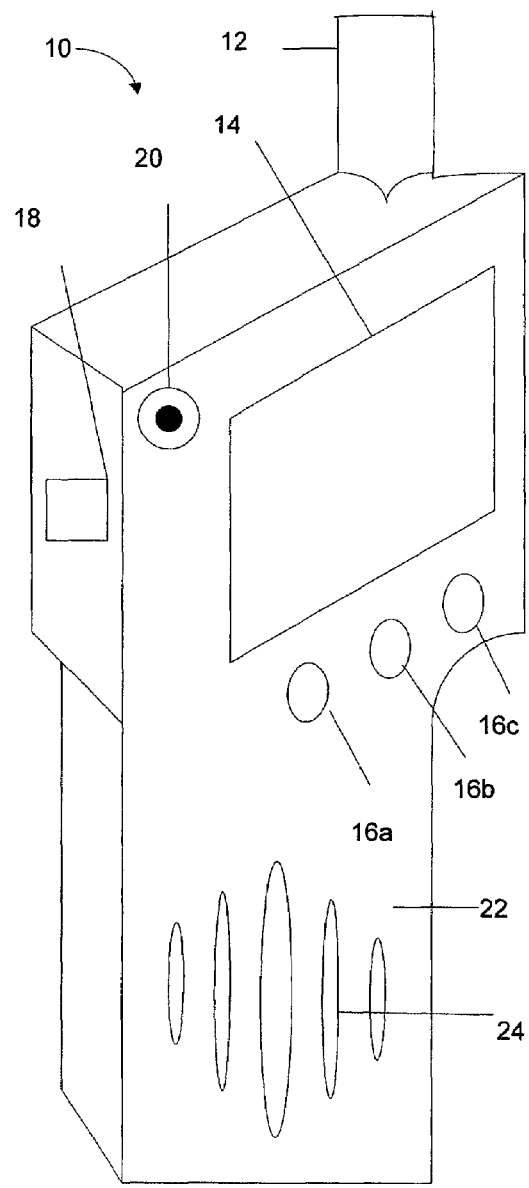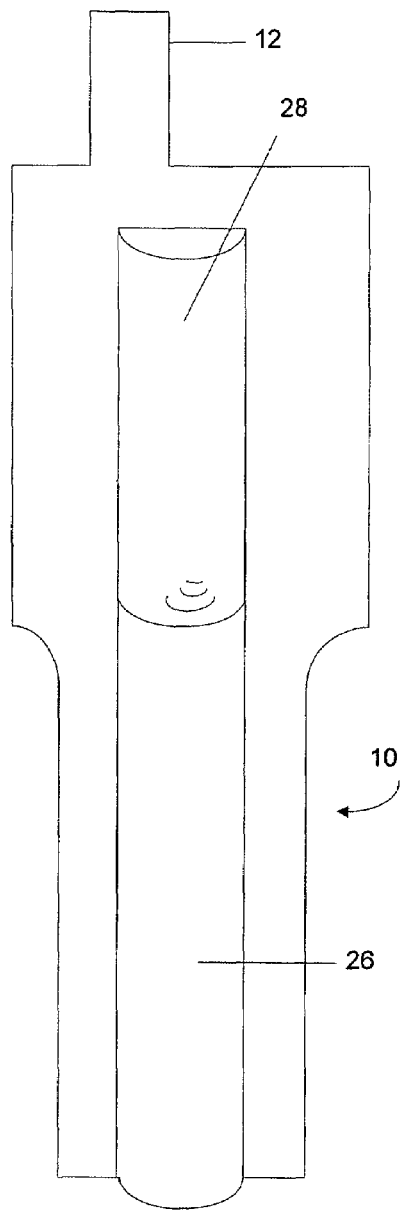
FIG. 1
FIG. 2

TIRE PRESSURE MONITOR SYSTEM MODULE

RELATED APPLICATIONS

This application is related to co-pending U.S. Patent Application titled "Tire Pressure Monitor System Tool With Vehicle Entry System," filed concurrently herewith, co-pending U.S. Patent Application titled "Tire Pressure Monitor Initiation Tool With Vehicle Data Interface," filed concurrently herewith, and co-pending U.S. Patent Application titled "Tire Pressure Monitor System Tool With Re-Learn and Diagnostic Procedures," filed concurrently herewith, each of which is incorporated herein by reference in its entirety.

FIELD OF THE INVENTION

The invention relates generally to tire pressure monitor systems. More particularly, the invention relates to a tire pressure monitor system module that provides tire pressure monitor system functionality to modular products.

BACKGROUND OF THE INVENTION

Systems have been developed to monitor, for example, vehicle tire pressure, and to report the tire pressure to a receiver at a central monitoring station using radio transmissions. A typical remote automotive tire condition monitoring system includes a plurality of tire-based sensory transponders and a central, vehicle-based arrangement. The sensory transponders include a component that senses a tire condition, such as tire inflation pressure or tire temperature. Each transponder is capable of outputting a coded transmission that conveys sensed tire condition information and an identifier for reception by the vehicle-based arrangement. Within the vehicle-based arrangement, an electronic control unit ("ECU") processes the conveyed information and controls provision of information regarding the sensed tire conditions to a vehicle operator. During operation of such a system, the vehicle operator is readily notified of a current tire condition, such as a low inflation pressure in a tire.

For a vehicle operator to determine which tire has a condition of interest (e.g., a low inflation pressure), information provided to the vehicle operator must unambiguously identify the location (e.g., right front) of the tire that has the condition of interest. In order for the ECU to provide such tire location information, the ECU has a memory that stores tire identification information for comparison with the identification conveyed from the transponder. Also, within the memory, a certain tire location is associated with each stored tire identification. Thus, once a provided identification is matched to a stored identification, a location on the vehicle is associated with the provided tire condition information. Accordingly, the operator is made aware that the tire at a certain location (e.g., right front) has the certain condition (e.g., low inflation pressure).

Changes routinely occur regarding the tires and/or transponders that are associated with a vehicle. The changes can result in new, different transponders being associated with the vehicle, or a rearrangement of the locations of the transponders, via rearrangement of the tires. Examples of such changes occur when one or more new tires with new transponders are mounted on a vehicle (e.g., the placement of the initial set of tires during vehicle manufacture or replacement of one or more tires), when the tires are rotated during routine maintenance, or when a transponder is replaced on an existing tire. It should be readily apparent that new/modified identification and location information regarding the tire must be provided or "taught" to the ECU.

In order to accomplish the "teaching" of the tire identification information to a vehicle-based portion, one known tire identification system is placed in a "learn" mode via actuation of pushbutton(s) on an operator-accessible information panel of the vehicle-based portion. During the learn mode, the vehicle-based portion is in a ready state to receive a distinctive "learn" mode signal transmitted from each of tire-based transmitter of the system. In order to cause each tire-based transmitter to send the "learn" mode signal, a strong magnet is swept over the outside of the associated vehicle tire.

A monitor is located at each tire and periodically takes a measurement of the tire pressure. A pressure signal is generated that corresponds to the pressure within the tire. The monitor transmits the measurement in a radio frequency transmission to the central monitoring station that produces an alarm or a display in response to the measurement. When the tire pressure drops below a predetermined pressure, an indicator is used to signal the vehicle operator of the low pressure.

During assembly and routine maintenance such as tire rotation or tire replacement, the tire pressure system must be calibrated. Calibration involves associating the various tire positions with the pressure transmitters that are located on the tires. One proposed method for calibrating a system uses a magnet device to initiate the calibration. In this system, an internal display panel with locations corresponding to the tire location is activated. When the tire locations are illuminated on the display, the vehicle operator or service technician places the magnet near the indicated tire. The transducer then sends a code corresponding thereto to the central controller. When the indicator indicates another tire location, the magnet must be brought near each tire location until each of the tire locations have a tire registered thereto. One problem with this device is that a separate component such as a magnet must be provided to the vehicle operator that is used only in the calibration process. One problem associated with a separate magnet device is that such a device is subject to loss. Thus, the tire pressure sensing system would be rendered inoperable.

One problem with such systems is the need to program the location of the transmitters at the central station. To be useful, the tire pressure is preferably associated with the tire which originated the measurement when presenting a display or alarm. Each monitor includes identification information that can be transmitted with the measurement. The tire monitor is preferably activated to produce and convey this information to the central station and associated with the position of the tire.

In one technique, the tire monitors include a reed switch or other magnetic device. A magnet is passed near the reed switch causing the monitor to transmit a radio frequency transmission that includes identification data. A service technician repeats this process at each wheel and then loads the identification and position information into the central monitoring station.

One drawback with such a system is that because many wheels are made from steel which is a magnetic material, tire pressure sensing systems may not operate properly because the steel wheels may shield the magnetic energy. Therefore, the system may also be rendered inoperable because the pressure transmitter is not activated by the magnet.

Various tire manufacturers have suggested various locations for the pressure sensors. Known systems include coupling a pressure sensor to the valve stem of the tire. Other known systems and proposed systems locate the pressure sensors in various locations within the tire wall or tread.

These previous techniques have been limited in effectiveness. The magnetic programming technique may be subject to interference and crosstalk, for example in a factory where many such tire monitors are being assembled with tires and vehicles. Also, users of modular products are required to purchase a separate tool to interface with tire pressure monitor systems.

SUMMARY OF THE INVENTION

In accordance with one embodiment of the invention, a tire pressure monitor system module is provided that provides modular products with tire pressure monitor system functionality. The tire pressure monitor system module may be added to a modular product such as, for example, a Genisys/Solarity Scope Module, a Genisys/Solarity Performance Gas Module, and a Genisys Cartridge Reader Module, to provide tire pressure monitor system functionality. According to one embodiment of the invention, the tire pressure monitor system module is a stand-alone module that may be attached, connected or in communication with a modular product.

In accordance with another embodiment of the invention, the tire pressure monitor system tool includes substantially all, if not all, of the functionality available to tire pressure monitor systems. For example, the tire pressure monitor system module may include modules for transmitting and receiving signals from a tire pressure monitor system, resetting and diagnosing a tire pressure monitor system, initiating, determining, and selecting procedures associated with the tire pressure monitor system, simulating a tire pressure sensor of a tire pressure monitor system, storing, displaying, and updating information related to tire pressure monitor systems, and notifying a user of a status of a procedure and that a procedure has been completed.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. For example, although the invention is described in terms of a plurality of modules, it is to be understood that the invention may be implemented using one or more modules. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a front perspective view of a tire pressure mounting tool according to one embodiment of the invention.

FIG. 2 is a rear view of a tire pressure monitor tool according to one embodiment of the invention.

DETAILED DESCRIPTION

Figure 3:
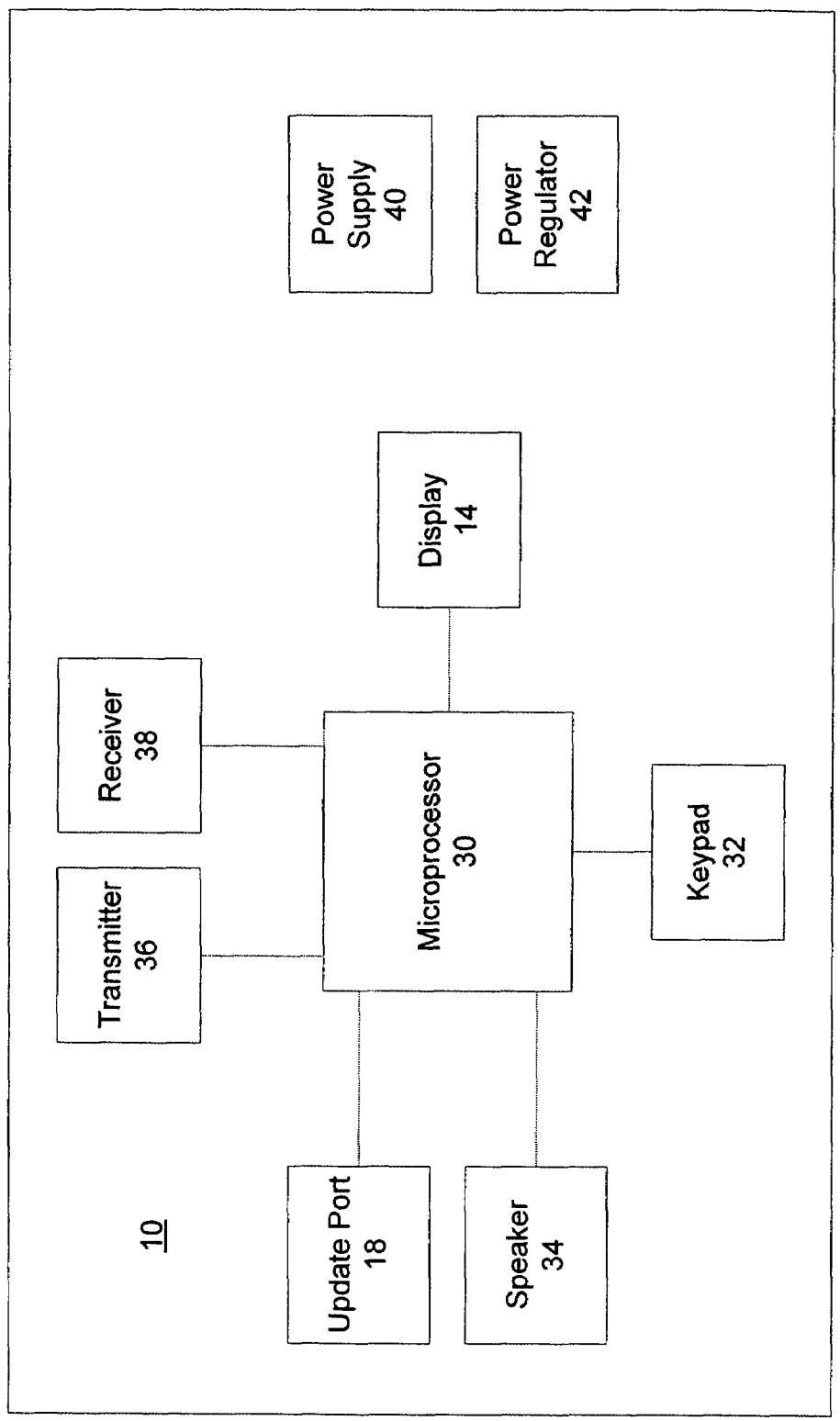
FIG. 3 is a block diagram of a tire pressure monitor tool according to one embodiment of the invention.

FIG. 1 illustrates a tire pressure monitor tool 10 according to one embodiment of the invention. The tool 10 includes an antenna 12, display 14, selector button 16a-16c, port 18, a power button 20, a casing 22, and passages 24. The antenna 12 may be used to transmit signals from the tool 10 to an electronic control unit of a vehicle and a tire pressure sensor mounted, for example, on a rim or tire of a vehicle. The display 14 may be used to display information to a user regarding, for example, the tool 10, a tire pressure monitor system of a vehicle or status information regarding a resetting or diagnostic function of the tool 10. The selector buttons 16a-16c may be used to navigate through the displays presented on the display 14 and select that certain functions be performed. The selector buttons 16a-16c may be positioned below select displays presented on the display 14. The selector buttons 16a-16c may be used to select one of the selection displays presented on display 14. The selection displays may be, for example, up and down arrows, an enter function, a menu function, start, activate, and next operations, yes, no, okay, redo, and stop functions, and reuse or new functions. The selection displays are described in further detail below.

The port 18 may be a port that enables the tool 10 to be connected to, for example, a computer or Internet connection that enables the tool to be updated with modified or additional information. The port 18 may be, for example, an RS232 serial port that connects the tool 10 to the computer or Internet connection using an RS232 serial cable. This is described in further detail below.

The power button 20 may be used to turn the tool 10 on and off. According to one embodiment of the invention, the tool may turn off automatically after, for example, three to four minutes of inactivity.

The casing 22 provides a housing for the tool 10. The casing may be provided with the passages 24 that may be located in front of a speaker (not shown) that emits audible tones or other notifications while the tool 10 is being used.

FIG. 2 illustrates a rear view of the tool 10 according one embodiment of the invention. The tool 10 may be battery powered. Therefore, the tool 10 may be provided with a battery compartment 26. The battery compartment 26 may include a removable battery cover 28 that allows removable insertion of batteries within the battery compartment 26. According to one embodiment of the invention, the tool 10 is powered by three (3) size C batteries.

FIG. 3 illustrates a block diagram of the tool 10 illustrated in FIGS. 1 and 2. The tool 10 may include a microprocessor 30 that processes software used to operate the tool 10. According to one embodiment of the invention, the microprocessor is an ATMEGA2561 microprocessor having a clock speed of 8 Mhz. The microprocessor 30 communicates with a keypad 32. According to one embodiment of the invention, the keypad 32 includes the selector buttons 16a-16c illustrated in FIG. 1. The microprocessor 30 may also be in communication with a speaker 34. The speaker 34 may be used to provide audible tones or notifications during use of the tool 10.

The microprocessor 30 may also be in communication with a transmitter 36 and a receiver 38. The transmitter 36 may be used to transmit signals to a tire pressure sensor mounted on a wheel of a vehicle or an electronic control unit of a vehicle. According to one embodiment of the invention, the transmitter 36 operates at 125 khz. Although only one transmitter is shown, it is to be understood that multiple transmitters including transmitters of different types may be used.

The receiver 38 may be used to receive signals transmitted from a tire pressure sensor mounted on a wheel vehicle and an electronic control unit of a vehicle. According to one embodiment of the invention the receiver 38 may operate at 315 Mhz and have a clock speed of 10.178 Mhz. Alternatively, the receiver 38 may operate at 433 Mhz and have a clock speed of 13.225 Mhz. Although only one receiver is shown, it is to be understood that multiple receivers operating at different frequencies and having different clock speeds may be used.

The tool 10 may also include a, power supply 40. As stated above, the power supply may be, for example, three (3) size C batteries. The power supply 40 may be in communication with a power regulator 42. The power regulator 42 may be used to regulate the power supplied to each device of the tool 10.

Figure 4:
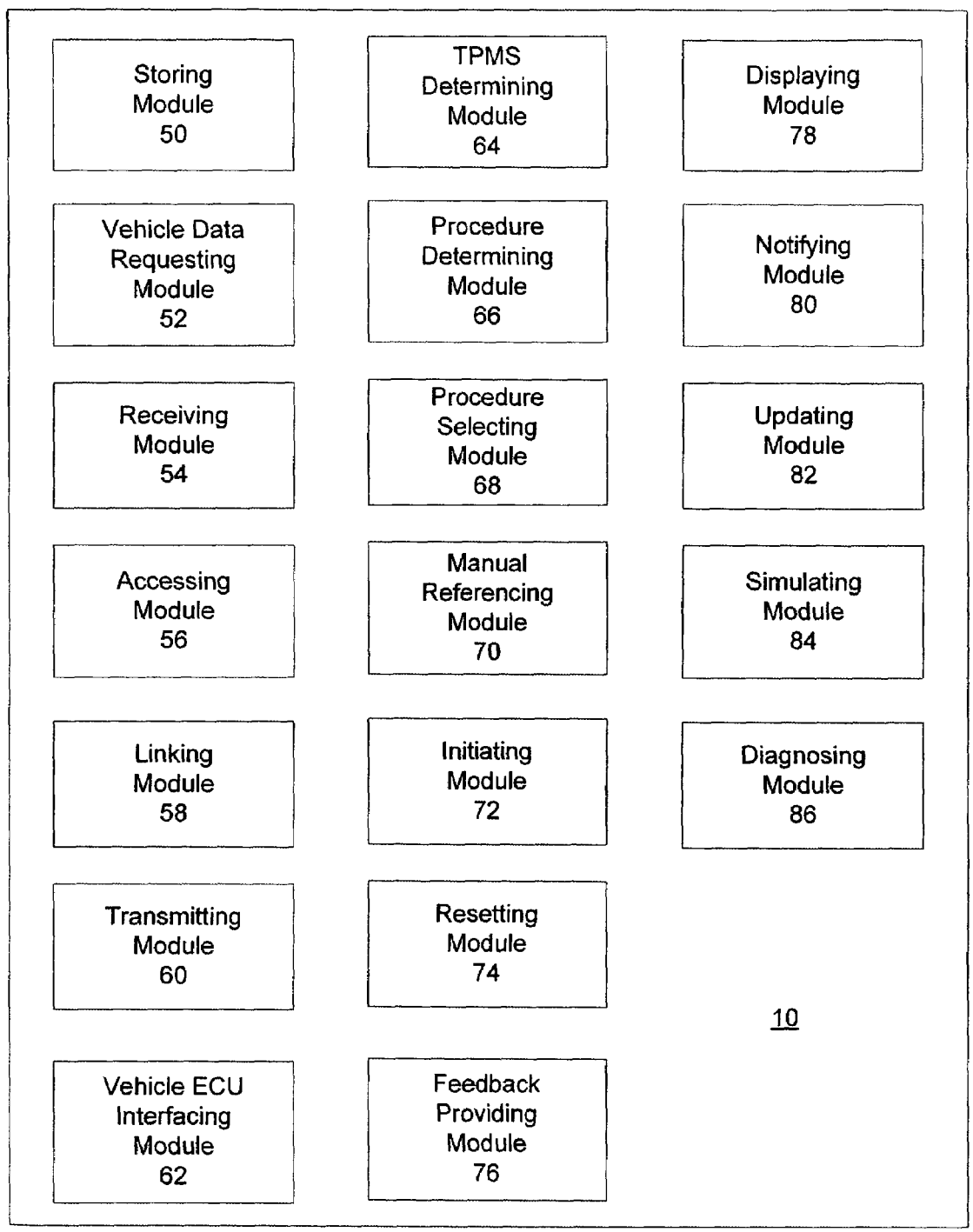
FIG. 4 is a block diagram of a tire pressure monitor tool according to one embodiment of the invention.

FIG. 4 illustrates a block diagram of the tire pressure monitor tool 10 shown in FIGS. 1 and 2 according to one embodiment of the invention. The tool 10 may include a storing module 50 that stores information regarding a plurality of tire pressure monitor systems. According to one embodiment of the invention, the information stored relates to a plurality of tire pressure monitor systems from a variety of vehicle manufactures and various models and years of the vehicles. The storing module 50 may be, for example, any suitable storage medium such as a storage module on a microprocessor, a hard disk, a removable storage media such as a flash disk for other suitable storage mechanism. The tool 10 also includes a vehicle data requesting module 52. The vehicle data requesting module 52 may be used to request data regarding a particular vehicle for which the tool 10 may be used. The vehicle data requesting module 52 may present a user of the tool 10 with a plurality of screens displaying information regarding various vehicle types. For example, the user may be presented with the vehicle data associated with the vehicle for which the tool 10 was most recently used. According to another embodiment, the user may be presented with a series of screens displaying lists of various makes, models, and years of various vehicles. The user may use the selector buttons to navigate the lists and select the make, model, and year of a desired vehicle. A receiving module 54 may be used to receive input provided by the user.

An accessing module 56 may be used to access the information stored in the storing module 50 to determine whether any of the information stored by the storing module 50 is associated with the vehicle data input by the user. If the storing module 50 does not include any information associated with the vehicle data, the user may be notified that no information was located. If information associated with the vehicle data is located, however, a linking module 58 may be used to link the information with the vehicle data. The information may include, for example, communication protocols for communicating with an electronic control unit of the vehicle, procedures for resetting a tire pressure monitor system of the vehicle, diagnosing the tire pressure monitor system of the vehicle or other functions.

A transmitting module 60 may then be used to transmit a signal from the tool 10 to a tire pressure sensor of the vehicle or an electronic control unit of the vehicle. If the signal is transmitted to the electronic control unit of the vehicle, a vehicle electronic control unit interfacing module 62 may be used to interface with the vehicle electronic control unit. The tool 10 may interface with the vehicle electronic control unit to, for example, reset a tire pressure monitor system of the vehicle. As discussed above, tire replacement and rotation requires resetting of the vehicle's tire pressure monitor system. This enables the vehicle electronic control unit to maintain locations of each tire pressure sensor such that accurate information may be displayed to a driver of the vehicle using, for example, a dashboard display of the vehicle.

A tire pressure monitor system determining module 64 may be used to determine a type of tire pressure monitor system provided on the vehicle. This information may be obtained, for example, from the vehicle electronic control unit or by matching the vehicle data with vehicle data provided in a lookup table stored by the tool. The vehicle data may be associated with the particular type of tire pressure monitor system installed on the vehicle. Upon determining the tire pressure monitor system installed on the vehicle, a procedure determining module 66 may determine a procedure to be followed to, for example, reset or diagnose the tire pressure monitor system of the vehicle. Based on instructions input by a user, a procedure selecting module 68 selects the procedure corresponding to the instructions input by the user. Some procedures may require a user to perform procedures specific to a vehicle. These procedures are typically located in an owner's manual of the vehicle. Therefore, a manual referencing module 70 may be used to refer to the owner's manual so that the user may perform this procedure prior to continuing to use the tool 10.

According to one embodiment of the invention, an initiating module 72 may be used to initiate one or more tire pressure sensors of a vehicle. Initiating the tire pressure sensors places the sensors in a state that enables the sensors to communicate with the tool 10 and the electronic control unit of the vehicle. After initiating the sensors, the tire pressure monitor system of the vehicle may be, for example, reset using resetting module 74. The resetting module 74 enables the electronic control unit of the vehicle to determine locations, identification numbers, and other information regarding the tire pressure sensors mounted one or more wheels of the vehicle. According to one embodiment of the invention, the antenna 12 of the tool 10 is placed adjacent a valve stem of a wheel of a vehicle. The tool 10 receives, for example, location, identification number, pressure information, and possibly other information from the tire pressure sensor using receiving module 54 and transmits the information to the vehicle electronic control unit using transmitting module 60.

A feedback providing module 76 may be used to determine whether the tire pressure monitor system has been reset. For example, the feedback providing module 76 may cause symbols, text or other information to be displayed on the display 14 indicating that a reset procedure has been completed. The information may be displayed on the display 14 using displaying module 78. A notifying module 80 may be used to notify the user that a reset or other procedure has been completed. For example, the notifying module 80 may cause an electronic control unit of a vehicle to sound a horn of the vehicle or flash one or more lights of a vehicle indicating that the reset or other procedure has been completed.

An updating module 82 may be used to update the information stored by the storing module 50. The updating module 82 may be in communication with the port 18. The updating module 82 may receive information from a computer, the Internet or other data source using, for example, an RS232 serial cable connected to the port 18 and the computer or other device. The updating module 82 may modify information stored by the storing module 50 or add information to the storing module 50. Additional information may be, for example, information relating to tire pressure monitor systems installed on newer vehicles.

The tool 10 may also include a simulating module 84. The simulating module 84 may be used to simulate a tire pressure sensor to validate the functionality of a tire pressure monitor system on a vehicle.

A diagnosing module 86 may also be used to diagnose a tire pressure monitor system on a vehicle. The diagnosing module 86 may be used to obtain, for example, tire pressure and other information from the sensor.

Figure 5:
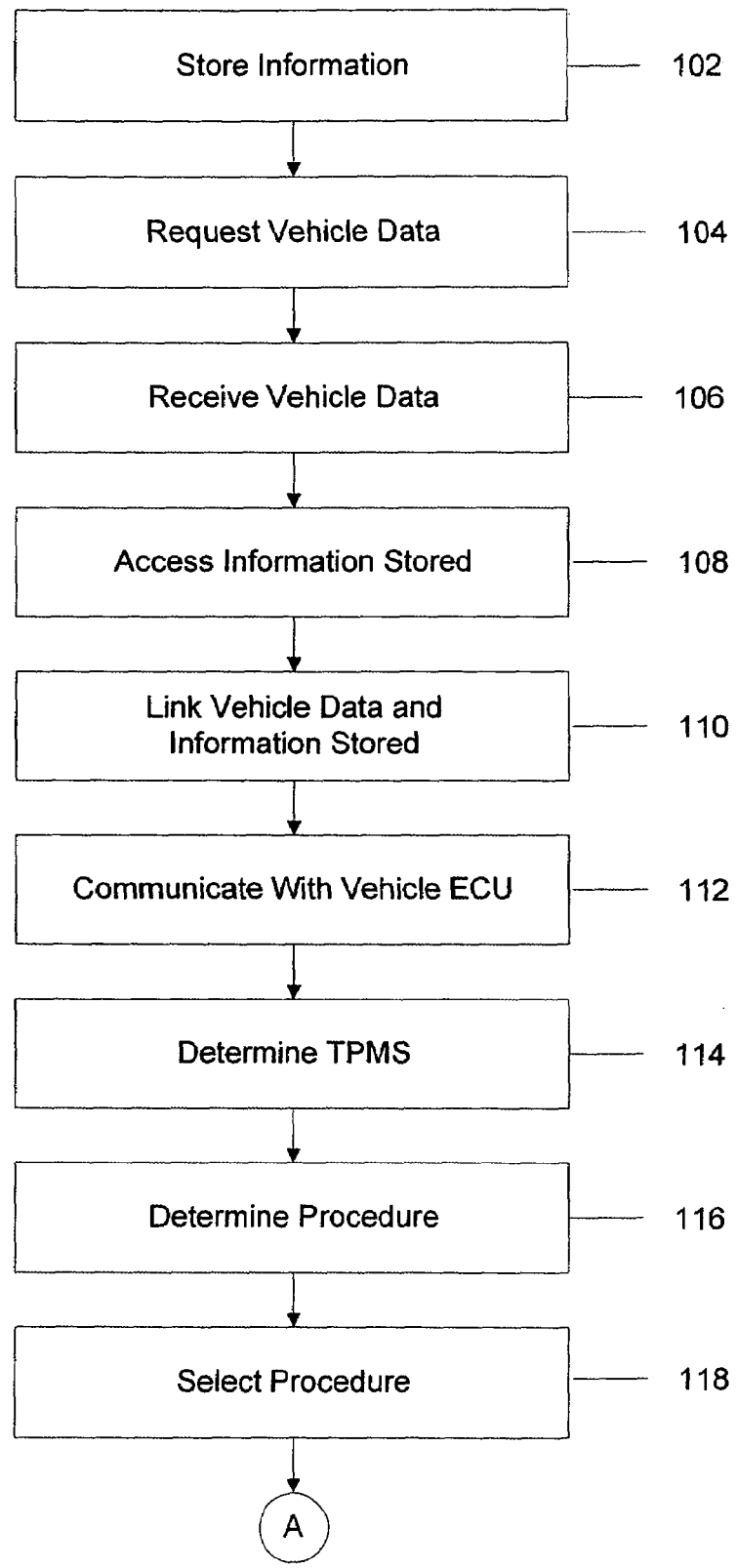
FIGS. 5 and 6 illustrate a method of communicating with a tire pressure monitor system of a vehicle according to one embodiment of the invention.
Figure 6:
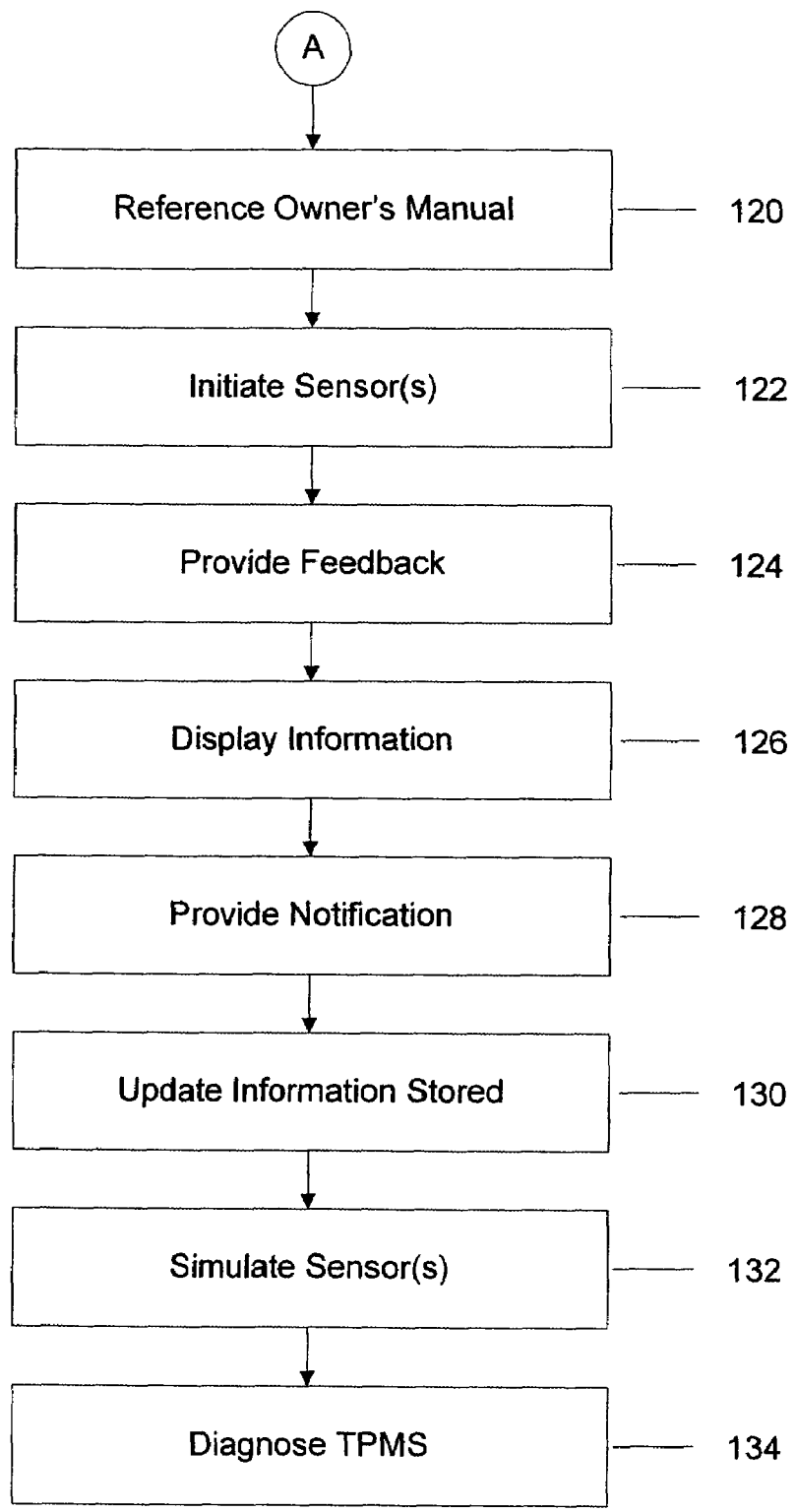

FIGS. 5-6 illustrate a method of communicating with a tire pressure monitor system of a vehicle using a tire pressure monitor tool according to one embodiment of the invention. In step 102, information regarding tire pressure monitor systems and vehicles using such vehicles may be stored by the tire pressure monitor tool. The tool may be used to obtain tire pressure information from one or more wheels of a vehicle provided with tire pressure sensors. To communicate properly with a tire pressure sensor, the tire pressure tool must be provided with data regarding the vehicle from which tire pressure information is sought. Vehicle data may be requested using the tool as illustrated in step 104. Vehicle data may be requested by, for example, displaying a make, model, and year of a vehicle and requesting that the user confirm or change the vehicle data.

If the vehicle data displayed is not related to the vehicle from which tire pressure information is sought, the tool may provide a series of displays to the user enabling the user to select a make, model, and year data from among a list of makes, models, and years. This information may be received by the tool in step 106. The information stored in step 102 is then accessed in step 108 to determine whether tire pressure monitor system information relating to the vehicle data received by the tool is being stored. If information relating to the vehicle data is located, this information is linked with the vehicle data in step 110.

The tool may use this information to communicate with the electronic control unit of the vehicle, step 112. Based on the communication with the electronic control unit, a determination may be made regarding a tire pressure monitor system installed on the vehicle 114. Based on the tire pressure monitor system installed, a determination may be made regarding a procedure to, for example, reset or diagnose the tire pressure monitor system, step 116. The resetting or diagnosing procedure is then selected based on input provided by a user using the tool 10 as illustrated in step 118. The resetting or diagnosing procedure may require a user to perform a procedure particular to the vehicle. Therefore, the tool may reference a vehicle owner's manual so that the user may follow the procedure identified in the owner's manual, step 120. The procedure may be, for example, placing the vehicle in a learn mode such that the vehicle or electronic control unit is able to receive tire pressure monitor system information from tire pressure sensors provided on one or more wheels of the vehicle.

In step 122, one or more of the tire pressure sensors provided on the wheels of the vehicle may be initiated. Initiating the tire pressure sensors enable the sensors to communicate with the tool 10 and the vehicle electronic control unit. Initiating the sensors may be performed by, for example, placing an antenna of a tire pressure monitor tool adjacent or near a valve stem of a wheel of the vehicle. The tool 10 transmits and receives information between the vehicle electronic control unit and the tire pressure sensor such that the vehicle or the electronic control unit may determine a location, identification number, tire pressure, or other information from the tire pressure sensor.

Feedback may be provided to the user to, for example, indicate that a sensor has been successfully initiated or that the signal has been received by the tire pressure monitor tool, step 124. This information may be displayed on a display of the tire pressure monitor tool as illustrated in step 126. The user may also be notified whether a resetting or diagnosing procedure has been completed, step 128. For example, the tool 10 may cause the electronic control unit of the vehicle to sound a horn of the vehicle or flash one or more lights of the vehicle indicating that the resetting or diagnosing procedure has been completed.

According to one embodiment of the invention, the tool 10 may be updated with modified or additional tire pressure monitor system information, step 130. For example, the tool may be provided with a port that receives, for example, an RS232 serial cable that may be connected to a computer, the Internet or other data source such that tire pressure monitor system information may be communicated to the tool in step 130 and stored in step 102. The tire pressure monitor system information may include modifications or additions to the information already stored by the tire pressure monitor tool.

The tool 10 may also simulate a tire pressure sensor of a vehicle, step 132. The tool 10 may simulate the tire pressure sensor to validate the functionality of a tire pressure monitor system installed on a vehicle. The tool 10 may also be used to diagnose the tire pressure monitor system, step 134. The tool 10 may be used to obtain information such as tire pressure and sensor identification information. Additionally, the tool 10 may obtain information regarding a battery condition of the batteries provided in the tire pressure monitor tool 10.

Figure 7:
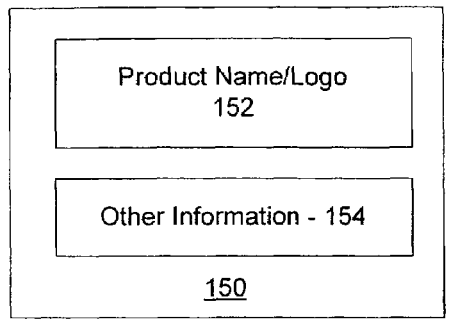
FIGS. 7-9 illustrate initial screens that may be displayed by a tire pressure monitor tool according to one embodiment of the invention.
Figure 8:
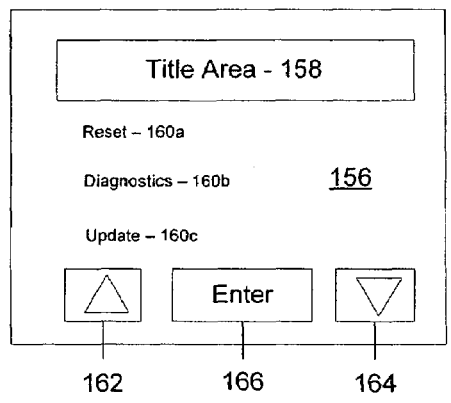
Figure 9:
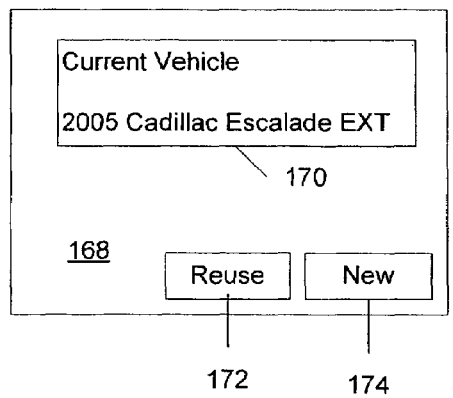

FIGS. 7-9 illustrate initial displays that may be presented to a user of a tire pressure monitor tool according to one embodiment of the invention. FIG. 7 illustrates a display 150 that may be, for example, a start up screen displayed on the tire pressure monitor tool display. The display 150 may include a product name and/or logo 152 and/or other information 154. FIG. 8 illustrates a display 156 that may be, for example, a main menu of the tool. The display 156 may include a title area 158 for displaying a title of the display. The display 156 may include a plurality of a selectable options 160a-160c that may be displayed in a list in the display 156. The selectable options 160a-160c may include, for example, reset 160a, diagnostics 160b, and update 160c. The selectable options 160a-160c may be navigated using selection displays presented above selector buttons provided on the tire pressure monitor tool. The selection displays may be, for example, an up arrow 162 and a down arrow 164. By pressing the selector buttons provided on the tool, a user may navigate up and down the display 156 to select a desired function. The function may be selected by pressing the selector button located beneath selection display Enter 166 provided on the display 156. The tool may indicate a function to be selected by, for example, highlighting, circling, underlining or other formatting to distinguish the function to be selected among other selectable functions.

Figure 10:
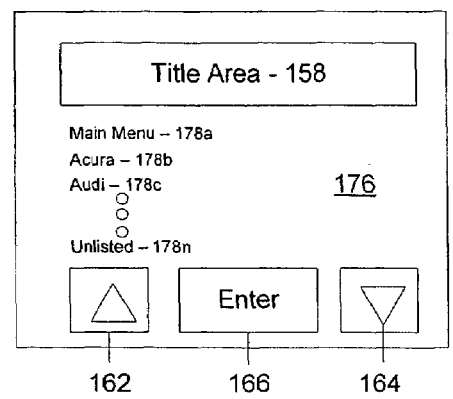
FIGS. 10-18 illustrate procedure screens that may be displayed by a tire pressure monitor tool according to one embodiment of the invention.

FIG. 9 illustrates a vehicle information screen display 168 that displays information regarding a particular vehicle. The display 168 may include an information display area 170 that displays vehicle data regarding a particular vehicle. The display 168 also includes selection displays 172, 174 that enable a user to either reuse the vehicle data provided on the display 168 or create new vehicle data, respectfully. FIG. 10 illustrates a display 176 that enables a user to select a vehicle make. The display 176 may include a title area 158 that provides a title of the display. The display 176 may also include a list of selectable options 178a-178n that a user may use to either select a vehicle make or return to the main menu. The display 176 may also include the selection displays 162, 164, and 166 described above. The user may use the selection displays 162, 164, and 166 to navigate and select a particular vehicle make or a main menu option for returning to the main menu.

Figure 11:
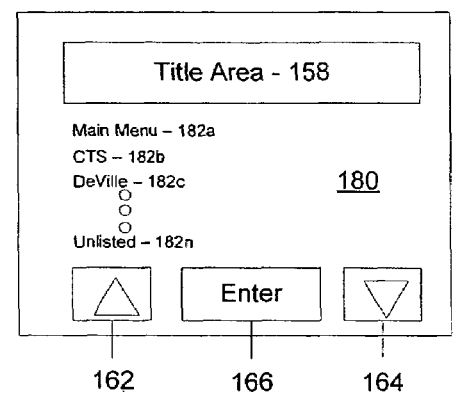
Figure 12:
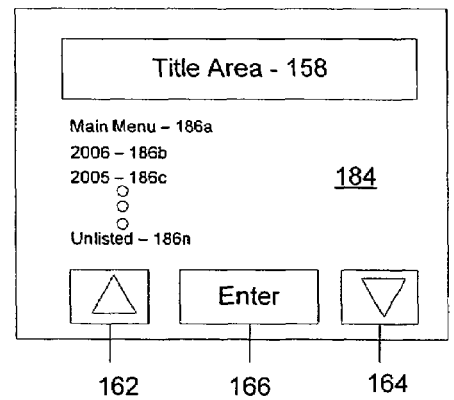

If a user selects a vehicle make, the user may then be presented with a display 180 as shown in FIG. 11. The display 180 may enable a user to select a particular model associated with the vehicle make selected using the display 176. The display 180 may include a list of selectable models associated with the vehicle make selected and also enable the user to return to the main menu. The display 180 may also include the selection displays 162, 164, and 166 as described. The user may navigate the list provided in the display 180 and select a desired model. If a user selects a desired model, the user may be presented with a display 184 as illustrated in FIG. 12. The display 184 may include a title area 158 and selection displays 162, 164, and 166 as described above. The display 184 may also include a list of years from which a user may select a desired year associated with the vehicle make and model previously selected. The display 184 may include a list having a main menu option 186a and a plurality of selectable years 186b-186n from which the user may select.

Figure 13:
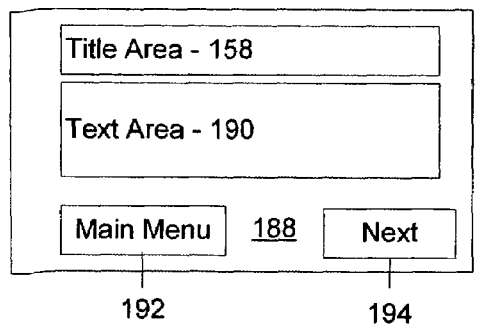

If the user selects a vehicle year, the user may be presented with a display 188 as illustrated in FIG. 13. The display 188 may include a title area 158 that provides a title of the display. The display 188 may also include a user instruction 190 providing a user with an instruction to perform a task. For example, the user may be instructed to refer to a particular section of the vehicle's user manual for performing a certain function. The display 188 may also include main menu selection display 192 and next selection display 194 displayed above two of the selector buttons provided on the tire pressure monitor tool. The user may use the selection displays 192, 194 to return to a main menu of the tire pressure monitor tool or proceed to a next step of, for example, a reset procedure after performing the task instructed in the display 188.

Figure 15:
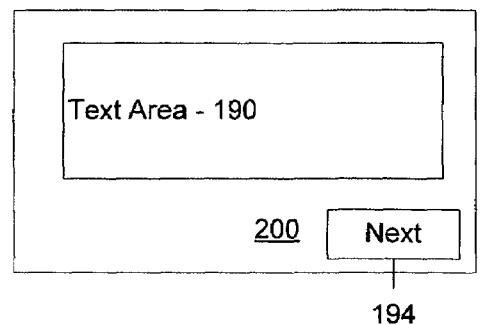
Figure 14:
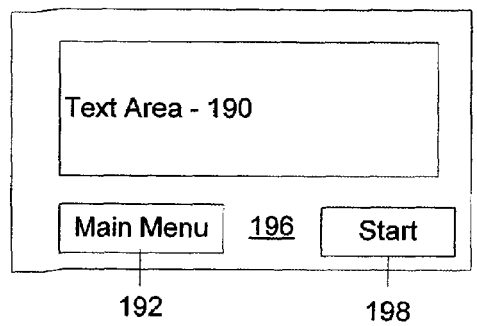
Figure 16:
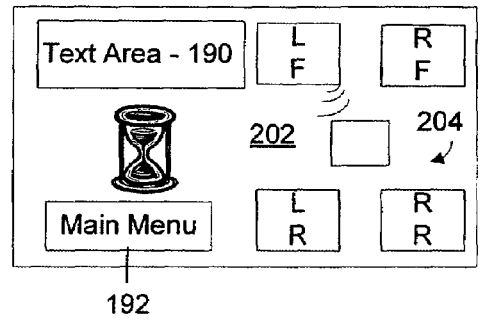

If the user selects the next selection display 194, the user may be presented with a display 196 as illustrated in FIG. 14. The display 196 includes an instruction 190 and a main menu selection display 192 as discussed above. The display 196 may also include a start selection display 198 presented above a selector button provided on the tire pressure monitor tool. If the user selects the start selection display 198, the user may be presented with a display 200 as illustrated in FIG. 15. The display 200 may include a user instruction 190 and a next selection display 194 as discussed above. After selecting the next selection display 194 the user may be presented with a display 202 as illustrated in FIG. 16.

The display 202 may provide text and/or graphics 204 illustrating that the tool is performing a function and may provide details regarding that function. For example, during a reset procedure, the display 202 may indicate that a left front tire pressure sensor is being reset and instructs the user to please wait. The display 202 may also include a main menu selection display 192 as discussed above.

Figure 17:
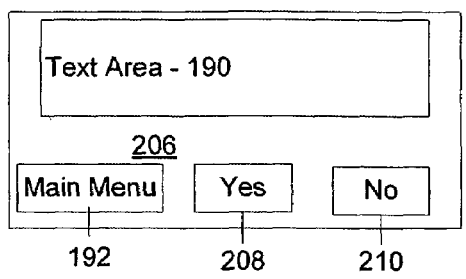

Upon completion of the function, a display 206 as illustrated in FIG. 17 may be presented on the tire pressure monitor tool. The display 206 may include a text area 190 that provides information to the user and may also include an interrogatory. The interrogatory may be, for example, "Did horn sound?". The display 206 may include selection displays Yes 208 and No 210 that enable the user to answer the interrogatory. The selection displays 208, 210 may be selected using selector buttons provided on the tool and below the selection displays. The selection 206 may also include a main menu selection display 192 as discussed above.

Figure 18:
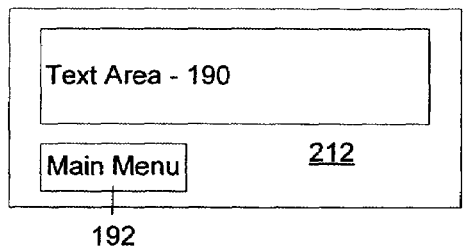

If the user selects Yes selection display 208, the user may be presented with a display 212 as illustrated in FIG. 18. The display 212 may include a text area 188 indicating that the procedure has been completed. The display 212 may also include a main menu selection display 192 as discussed above. If the user selects No selection display 210, however, the tool may present a previous display such as, for example, display 196 as illustrated in FIG. 14. This enables the user to repeat the procedure to attempt to properly complete the procedure.

Figure 19:
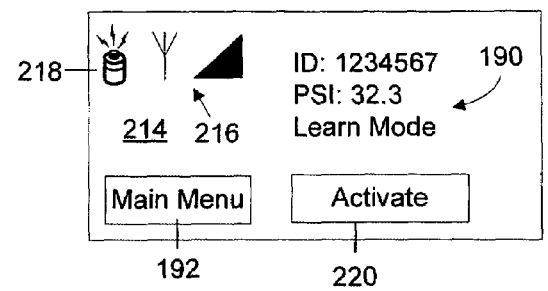
FIGS. 19-20 illustrate diagnostic procedure screens that may be displayed by a tire pressure monitor tool according to one embodiment of the invention.
Figure 20:
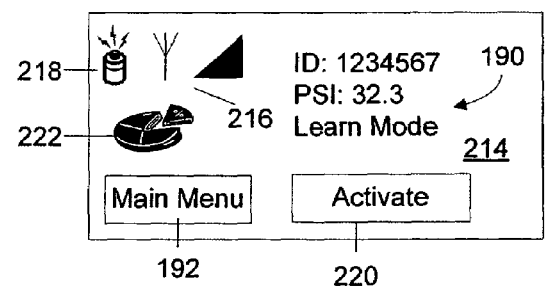

FIG. 19 illustrates a diagnostic test screen display 214 according to one embodiment of the invention. The display 214 includes a text area 190 and main menu selection display 192 as described above. The text display 190 may include, for example, an identification number of a tire pressure sensor from which tire pressure information has been received, the tire pressure for that particular tire, and an operating mode of the electronic control unit of the vehicle. The display may also include a signal indicator 216 indicating whether a signal is being received from the tire sensor and a battery level indicator 218 indicating an approximate battery level remaining in the batteries of the tire pressure monitor tool. The display 216 may also include an activate selection display 220 that activates a diagnostic procedure of the tire pressure monitor tool. Upon selection of the activate selection display 220, a signal transmitting signal symbol 222 may be presented in a display 218 to indicate that the tire pressure monitor tool is transmitting a signal to the tire pressure sensor as illustrated in FIG. 20.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for use with a tire pressure monitoring system comprising:
   a vehicle data requesting module configured to request vehicle data;
   a vehicle data receiving module configured to receive the vehicle data;
   a storing module configured to store information regarding a plurality of tire pressure monitor systems;
   an initiating module configured to initiate at least one tire pressure sensor;
   a simulating module configured to simulate the at least one tire pressure sensor; and a tire pressure monitor system determining module configured to determine a tire pressure monitor system installed on a vehicle based on the information and the vehicle data.

2. The tool of claim 1, further comprising a vehicle electronic control unit interfacing module configured to interface with an electronic control unit of the vehicle.

3. The tool of claim 1, further comprising a procedure determining module, in communication with the tire pressure monitor system determining module, configured to determine at least one of an initiation procedure and a resetting procedure associated with the tire pressure monitor system.

4. The tool of claim 3, further comprising a procedure selecting module, in communication with the procedure determining module, configured to select at least one of the initiation procedure and the resetting procedure.

5. The tool of claim 4, further comprising a feedback providing module configured to provide feedback regarding at least one of the initiation procedure and the resetting procedure.

6. The tool of claim 1, further comprising an accessing module, in communication with the storing module, configured to access the information stored.

7. The tool of claim 1, further comprising an updating module, in communication with the storing module, configured to update the information stored by the storing module.

8. The tool of claim 7, wherein the updating module comprises an RS23 port.

9. The tool of claim 1, further comprising a displaying module configured to display at least one of vehicle information and tire pressure monitor system information.

10. The tool of claim 9, wherein the tire pressure monitor system information comprises at least one of tire pressure, tire pressure sensor identification, and sensor mode.

11. The tool of claim 1, further comprising a resetting module configured to reset the tire pressure monitor system.

12. The tool of claim 11, further comprising a notifying module, in communication with the resetting module, configured to notify a user that a tire pressure monitor system has been reset.

13. The tool of claim 12, wherein the notifying module is configured to notify the user by causing at least one of a vehicle horn to sound and at least one vehicle light to flash.

14. The tool of claim 11, further comprising a manual referencing module configured to reference a vehicle user manual.

15. The tool of claim 1, further comprising a diagnosing module configured to diagnose the tire pressure monitor system.

16. The tool of claim 1, wherein the vehicle data comprises vehicle make, model, and year data.

17. The tool of claim 1, further comprising a transmitting module configured to transmit a signal from the tool to the tire pressure monitor system.

18. The tool of claim 1, further comprising a receiving module configured to receive a signal from at least one of the tire pressure monitor system and the at least one tire pressure sensor.

19. The tool of claim 1, further comprising a linking module configured to link the vehicle data and the information stored by the storing module.

20. The tool of claim 1, wherein the tire pressure monitor system module is provided in a modular product.

21. The tool of claim 1, wherein the tire pressure monitor system module is provided on a modular platform.

22. A tool for use with a tire pressure monitoring system comprising:

vehicle data requesting means for requesting vehicle data;
vehicle data receiving means for receiving the vehicle data;
storing means for storing information regarding a plurality of tire pressure monitor systems;
initiating means for initiating at least one tire pressure sensor;
simulating means for simulating the at least one tire pressure sensor; and
tire pressure monitor system determining means for determining a tire pressure monitor system installed on a vehicle based on the information and the vehicle data.

23. The tool of claim 22, further comprising vehicle electronic control unit interfacing means for interfacing with an electronic control unit of the vehicle.

24. The tool of claim 22, further comprising procedure determining means, in communication with the tire pressure monitor system determining means, for determining at least one of an initiation procedure and a resetting procedure associated with the tire pressure monitor system.

25. The tool of claim 24, further comprising procedure selecting means, in communication with the procedure determining means, for selecting at least one of the initiation procedure and the resetting procedure.

26. The tool of claim 25, further comprising feedback providing means for providing feedback regarding at least one of the initiation procedure and the resetting procedure.

27. The tool of claim 22, further comprising accessing means, in communication with the storing means, for accessing the information stored.

28. The tool of claim 22, further comprising updating means, in communication with the storing means, for updating the information stored by the storing means.

29. The tool of claim 28, wherein the updating means comprises an RS23 port.

30. The tool of claim 22, further comprising displaying means for displaying at least one of vehicle information and tire pressure monitor system information.

31. The tool of claim 30, wherein the tire pressure monitor system information comprises at least one of tire pressure, tire pressure sensor identification, and sensor mode.

32. The tool of claim 22, further comprising resetting means for resetting the tire pressure monitor system.

33. The tool of claim 32, further comprising notifying means, in communication with the resetting means, for notifying a user that a tire pressure monitor system has been reset.

34. The tool of claim 33, wherein the notifying means is configured to notify the user by causing at least one of a vehicle horn to sound and at least one vehicle light to flash.

35. The tool of claim 32, further comprising manual referencing means for referencing a vehicle owner's manual.

36. The tool of claim 22, further comprising diagnosing means for diagnosing the tire pressure monitor system.

37. The tool of claim 22, wherein the vehicle data comprises vehicle make, model, and year data.

38. The tool of claim 22, further comprising transmitting means for transmitting a signal from the tool to the tire pressure monitor system.

39. The tool of claim 22, further comprising receiving means for receiving a signal from at least one of the tire pressure monitor system and the at least one tire pressure sensor.

40. The tool of claim 22, further comprising linking means for linking the vehicle data and the information stored by the storing means.

41. The tool of claim 22, wherein the tool is provided in a modular product.

42. The tool of claim 22, wherein the tool is provided on a modular platform.

43. A method of using with a tire pressure monitoring system comprising:
  requesting vehicle data;
  receiving the vehicle data;
  storing information regarding a plurality of tire pressure monitor systems;
  initiating at least one tire pressure sensor;
  simulating the at least one tire pressure sensor; and
  determining a tire pressure monitor system installed on a vehicle based on the information and the vehicle data.

44. The method of claim 43, further comprising interfacing with an electronic control unit of the vehicle.

45. The method of claim 43, further comprising determining at least one of an initiation procedure and a resetting procedure associated with the tire pressure monitor system.

46. The method of claim 45, further comprising selecting at least one of the initiation procedure and the resetting procedure.

47. The method of claim 46, further comprising providing feedback regarding at least one of the initiation procedure and the resetting procedure.

48. The method of claim 43, further comprising accessing the information stored.

49. The method of claim 43, further comprising updating the information stored.

50. The method of claim 49, wherein the updating uses an RS23 port.

51. The method of claim 43, further comprising displaying at least one of vehicle information and tire pressure monitor system information.

52. The method of claim 51, wherein the tire pressure monitor system information comprises at least one of tire pressure, tire pressure sensor identification, and sensor mode.

53. The method of claim 43, further comprising resetting the tire pressure monitor system.

54. The method of claim 53, further comprising notifying a user that a tire pressure monitor system has been reset.

55. The method of claim 54, wherein the notifying notifies the user by causing at least one of a vehicle horn to sound and at least one vehicle light to flash.

56. The method of claim 43, further comprising referencing a vehicle owner's manual.

57. The method of claim 43, further comprising diagnosing the tire pressure monitor system.

58. The method of claim 43, wherein the vehicle data comprises vehicle make, model, and year data.

59. The method of claim 43, further comprising transmitting a signal from the tool to the tire pressure monitor system.

60. The method of claim 43, further comprising receiving a signal from at least one of the tire pressure monitor system and the at least one tire pressure sensor.

61. The method of claim 43, further comprising linking the vehicle data and the information stored.

* * * * *